UNITED STATES PATENT OFFICE.

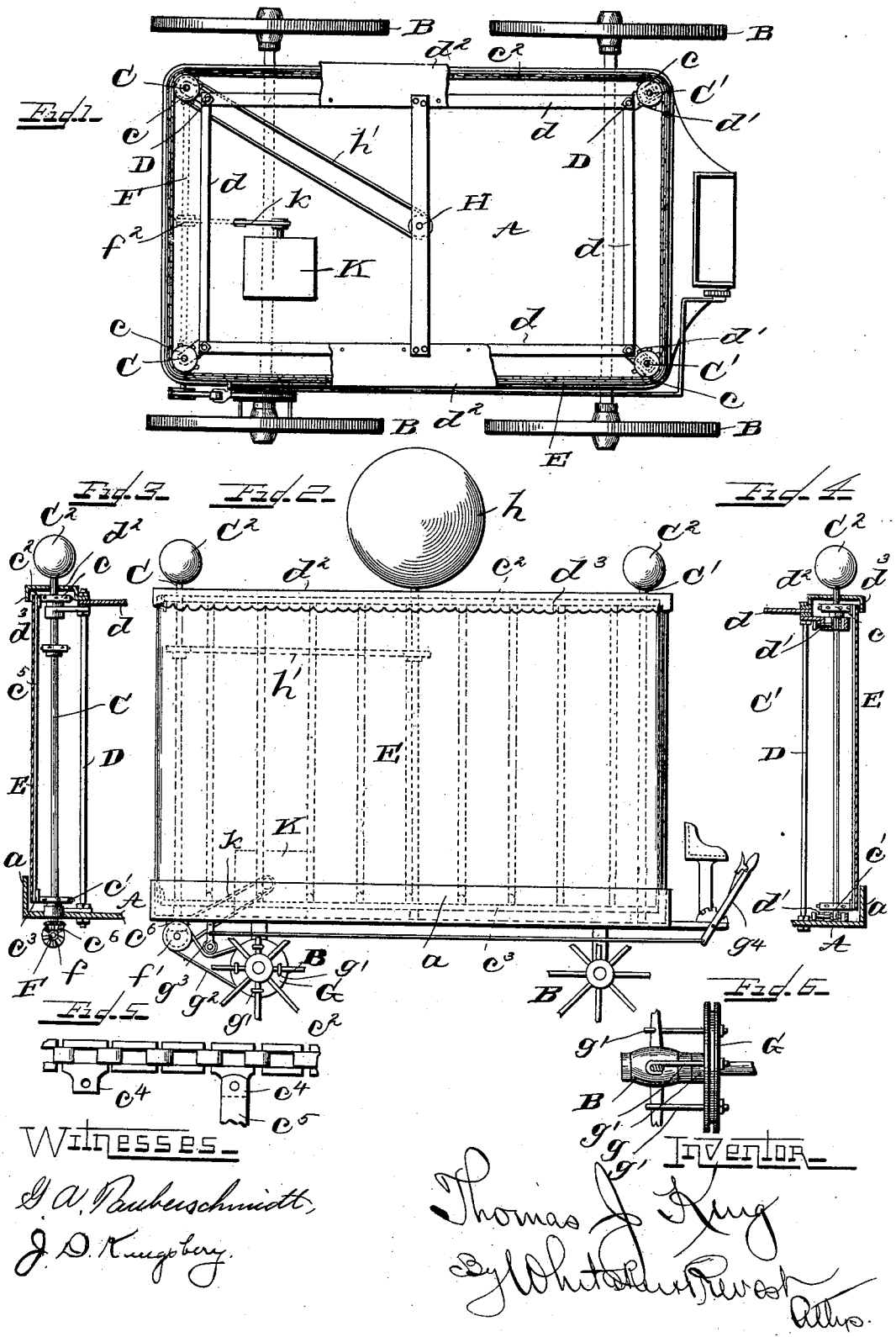

THOMAS J. KING, OF KNOXVILLE, TENNESSEE, ASSIGNOR TO THE KING REVOLVING ADVERTISER COMPANY, OF SAME PLACE.

ADVERTISING-VEHICLE.

SPECIFICATION forming part of Letters Patent No. 613,634, dated November 1, 1898.

Application filed May 19, 1897. Serial No. 637,250. (No model.)

*To all whom it may concern:*

Be it known that I, THOMAS J. KING, a citizen of the United States, residing at Knoxville, in the county of Knox and State of Tennessee, have invented certain new and useful Improvements in Advertising-Vehicles; and I do hereby declare the following to be a full, clear, and exact description of the invention, such as will enable others skilled in the art to which it appertains to make and use the same.

My invention is an improvement in advertising-vehicles; and it consists in the novel features hereinafter fully described, reference being had to the accompanying drawings, which illustrate one form in which I have contemplated embodying my invention.

Referring to the drawings, Figure 1 represents a top plan view of a vehicle embodying my invention, portions of the upper part of the same being removed to show the gearing beneath. Fig. 2 is a side elevation of the vehicle, portions of the wheels being broken away. Fig. 3 is a vertical longitudinal section of the rear portion of the vehicle. Fig. 4 is a similar section of a portion of the front of the vehicle. Fig. 5 is a detail view of a portion of one of the sprocket-chains for supporting and driving the flexible advertising-surface. Fig. 6 is a detail view of the main driving-pulley and the devices for attaching it to one of the wheels of the vehicle.

A represents the bottom of the body of the vehicle, which is provided with supporting-wheels B B B B. At each corner of the vehicle is mounted a vertical shaft C or C', the shafts at the rear of the vehicle being indicated by C C and those at the front of the vehicle being indicated by C' C'. These shafts can be supported in any desired manner. In this instance I have shown a rectangular frame $d$, supported upon vertical posts D D adjacent to the corners of the vehicle, the said frame being provided with bearings for the vertical shaft, as shown, and I also provide the bearings for the forward shafts C' C' with adjusting devices $d'$ $d'$, as shown in Fig. 4, so that said shafts may be adjusted bodily toward and from the center of the vehicle. The shafts C C C' C' are each provided at top and bottom with sprocket-wheels $c$ $c'$, and a chain $c^2$ extends around the upper sprocket-wheel $c$, while a similar chain $c^3$ extends around the sprocket-wheel $c'$ at the lower ends of said shafts. The sprocket-chain $c^2$ has certain of its links provided with downwardly-extending ears $c^4$, preferably perforated, as shown in Fig. 5, and the sprocket-chain $c^3$ is provided with similar ears, which, however, extend upwardly from said chain. The two sprocket-chains are connected at intervals by slats $c^5$, preferably of wood, which are riveted or otherwise secured to the perforated ears $c^4$ of the sprocket-chains. By having the front shafts C' C' mounted in adjustable bearings said shafts can be moved inward and rearward to enable the sprocket-chains to be placed in engagement with their sprocket-wheels, after which they can be adjusted outward to secure the proper tension of said chains, and by adjusting these shafts at different times the proper tension of the chains can be maintained at all times.

To the exterior of the slats $c^5$ is attached an endless band of flexible material—such as cloth, leather, or other suitable material—upon which advertisements are to be painted, pasted, or otherwise secured. It will thus be seen that by driving the endless chain the advertisements will be made to move around the vehicle continuously.

I prefer to provide the bottom of the vehicle with a rim $a$, (see Fig. 2,) which extends up far enough to cover the lower edges of the moving advertising-band E, and I also prefer to provide the rectangular frame $d$ with outwardly-projecting portions $d^2$, having a downwardly-extending edge $d^3$ to conceal the upper edges of the traveling bands.

In order to drive the endless advertising-bands, I preferably extend the rear shafts C downwardly through the bottom of the vehicle and provide them each with a beveled pinion $c^6$, which engages a pinion $f$ on a horizontal shaft F, which is supported beneath the rear end of the vehicle in any suitable manner and is provided at one end with a driving-pulley $f'$. I prefer to provide one of the rear wheels of the vehicle with a driving-pulley G, (shown in detail in Fig. 6,) which is provided with a hub portion $g$, adapted to engage the inner end of the hub of the wheel B, the said pulley G being secured to the wheel by means of a series of bolts $g'$, having hook portions at one end adapted to engage the spokes of the wheel and having their other ends passing through the pulley G and provided with securing-nuts. By this means the pulley G can be readily secured to a vehicle-wheel of the ordinary type.

The pulley G is connected by means of a band $g^2$ or belt with the pulley $f'$ on the shaft F, the said belt being kept tight by means of a pivoted belt-tightener $g^3$, which is controlled by a hand-lever $g^4$ adjacent to the driver's seat. By drawing this belt-tightener away from the belt the band can be released from pressure, so as to stop the revolution of the advertising-band, if it becomes desirable. I prefer to provide each of the shafts C and C' at its upper end with a ball $C^2$, the revolution of which will tend to attract attention, and these balls may be covered with advertising matter, if desired.

I also provide the vehicle with a central vertical shaft H, supported in suitable bearings and provided at its upper end with a large globe or sphere $h$, which is to be covered with suitable advertising matter, and said shaft H is driven by means of a belt or chain $h'$ from one of the shafts C, as shown in Figs. 1 and 2.

I also prefer to provide upon the interior of the vehicle a mechanical organ, piano, or other sound-producing apparatus K for the purpose of attracting attention to the vehicle as it is moved along, the said sound-producing device being driven by means of a belt $k$ from a driving-pulley $f^2$ on the horizontal shaft F. (See Figs. 1 and 2.)

What I claim, and desire to secure by Letters Patent, is—

In an advertising device, the combination with a vehicle-body and supporting-wheels, of an endless advertising-band mounted on said vehicle, a driving-pulley provided with a hub portion for engaging the hub of one of said wheels, a series of securing-bolts engaging said pulley and having hook portions to engage the spokes of said wheel, and operative connections between said pulley and said endless band, substantially as described.

In testimony whereof I affix my signature in presence of two witnesses.

THOMAS J. KING.

Witnesses:
J. G. JOHNSON,
JAS. H. WELCKER.